United States Patent [19]

Carlblom

[11] 4,229,274

[45] Oct. 21, 1980

[54] ULTRAVIOLET LIGHT CURABLE COMPOSITIONS FOR PRODUCING COATINGS OF LOW GLOSS

[75] Inventor: Leland H. Carlblom, Allison Park, Pa.

[73] Assignee: PPG Industries, Inc., Pittsburgh, Pa.

[21] Appl. No.: 15,544

[22] Filed: Feb. 26, 1979

[51] Int. Cl.$^2$ .................................................. C08F 8/00
[52] U.S. Cl. .......................... 204/159.15; 204/159.16; 204/159.18; 204/159.23; 204/159.24; 260/42.21; 427/54.1
[58] Field of Search ...................... 204/159.15, 159.16, 204/159.18, 159.23, 159.24; 96/115 P; 260/42.21

[56] References Cited

U.S. PATENT DOCUMENTS

| | | | |
|---|---|---|---|
| 3,874,906 | 4/1975 | Prucnal et al. | 204/159.16 |
| 3,915,824 | 10/1975 | McGinniss | 204/159.23 |
| 3,918,393 | 11/1975 | Hahn | 427/38 |
| 3,992,275 | 11/1976 | Shahidi et al. | 204/159.15 |
| 4,005,244 | 1/1977 | Wismer et al. | 428/480 |
| 4,017,652 | 4/1977 | Gruber | 427/54 |
| 4,048,036 | 9/1977 | Prucnal | 204/159.23 |
| 4,113,592 | 9/1978 | Rybny et al. | 204/159.16 |
| 4,131,529 | 12/1978 | Osterloh et al. | 204/159.14 |

OTHER PUBLICATIONS

Pappas et al., "Photoinitiation of Radical Polymerization", *UV Curing: Science and Technology,* Technology Marketing Corp., Stamford, Conn., (1978), pp. 2 to 22.
Turro, *Modern Molecular Photochemistry,* Benjamin/Cummings Publ. Co., Menlo Park, CA, (1978), p. 437.

*Primary Examiner*—Melvyn I. Marquis
*Attorney, Agent, or Firm*—George D. Morris

[57] ABSTRACT

Films of low gloss may be obtained by exposing to ultraviolet light coatings of a composition comprising photoinitiator, photosensitizer, quencher and compound having a plurality of acrylyloxy groups.

18 Claims, No Drawings

ULTRAVIOLET LIGHT CURABLE COMPOSITIONS FOR PRODUCING COATINGS OF LOW GLOSS

Coatings of most ultraviolet light curable coatings compositions, when exposed to ultraviolet light, are cured to glossy, crosslinked coatings. In many instances, however, it is desired to obtain crosslinked coatings of low gloss. One way to achieve low gloss coatings is by adding flatting pigment. Unfortunately, when the proportion of flatting pigment is increased in an attempt to produce coatings of lower gloss, the point is reached where the pigment to binder ratio is so high that there is insufficient binder to firmly hold the pigment. The result is a low gloss coating which lacks hardness and durability. Another method heretofore employed took advantage of the inhibition of polymerization which occurs when exposure of the film to radiation is conducted in the presence of oxygen. U.S. Pat. Nos. 3,918,393 and 4,048,036 illustrate this approach.

The present invention provides an ultraviolet light curable coating composition comprising at least one photoinitiator, at least one photosensitizer, at least one quencher and at least one compound having a plurality of acrylyloxy groups and capable of being free radically addition polymerized by interaction with the photoinitiator and the photosensitizer, wherein upon exposure to ultraviolet light, a coating of the coating composition is cured to a crosslinked film having a lower gloss than if the quencher were absent.

As used throughout the instant specification and claims, unless otherwise indicated either directly or by context, acrylyloxy is used in its broad sense to mean unsubstituted acrylyloxy or α-substituted acrylyloxy groups such as methacrylyloxy, ethacrylyloxy and α-chloroacrylyloxy. Similarly, unless otherwise indicated either directly or by context, acrylic unsaturation is used in its broad sense to mean the unsaturation provided by unsubstituted acrylyl groups or α-substituted acrylyl groups such as methacrylyl, ethacrylyl and α-chloroacrylyl.

Photoinitiators absorb photons and thereby obtain energy to form radical pairs. Using alkyl benzoin ether as an example, the absorption of a photon to produce a molecule excited to a higher energy level may be represented by the equation:

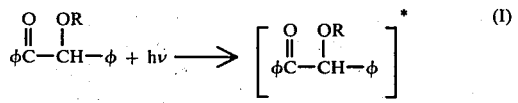
(I)

where φ is a phenyl group, R is an alkyl group and the asterisk indicates an excited molecule of higher energy due to absorption of the photon, hν. The excited molecule then forms a radical pair:

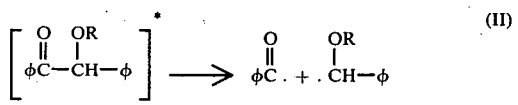
(II)

One or both members of the radical pair are then available to initiate addition polymerization of acrylyloxy groups. Because the photoinitiator does not require interaction with another compound to form free radicals, the reaction is termed unimolecular. Hence the photoinitiator used in the present invention generates a radical pair by way of unimolecular homolysis resulting from photoexcitation, at least one member of the radical pair being capable of initiating addition polymerization of acrylyloxy groups.

Free radicals necessary to the photopolymerization of acrylyloxy groups may also be produced by the interaction of two compounds. Such reactions are therefore classed as bimolecular.

One type of bimolecular reaction is hydrogen abstraction. Here, a photosensitizer, which is a good absorber of photons but which itself is a poor photoinitiator, absorbs photons to produce an excited molecule. The excited molecule then inter-reacts with a second compound to produce free radicals. Using benzophenone as an example of a photosensitizer, the reactions may be represented:

(III)

(IV)

where φ is a phenyl group, A is an organic or organometallic group, A—H is a monomer, a polymer or an added initiator which interacts with the photosensitizer and the asterisk has the meaning previously defined. In Equation IV, one or both of the free radicals are available to initiate addition polymerization of acrylyloxy groups. In reactions of the hydrogen abstraction type, the photosensitizer is often destroyed in the process of generating free radicals.

Another type of bimolecular reaction is the energy donor type. Here a photosensitizer molecule absorbs a photon to produce an excited molecule. The excited molecule then transfers energy to a second molecule which produces radical pairs. Again using benzophenone as an example of a photosensitizer, the reactions may be represented:

(V)

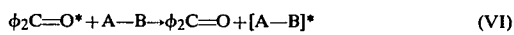
(VI)

(VII)

where φ, A and the asterisk are as previously defined, B is an organic or inorganic group and A—B is a monomer, polymer or added initiator which interacts with the photosensitizer. In Equation VII, one or both free radicals are available to initiate addition polymerization of acrylic groups. In reactions of the energy donor type, the photosensitizer serves to transfer energy and is not destroyed in the process.

In bimolecular reactions of either the hydrogen abstraction type or the energy donor type, the second compound with which the excited photosensitizer molecule interacts may, depending upon the specific identity of the second compound, be an initiator or a monomer. Photosensitizer employed in the present invention has a triplet energy in the range of from 54 to 72 kilocalories per mole and promotes photopolymerization through bimolecular photochemical reactions.

Quenchers are compounds or groups that absorb energy from an excited photosensitizer molecule before the sensitizer can inter-react with another compound to produce free radicals. The energy absorbed by the quencher is then dissipated. Again using benzophenone as an example of a photosensitizer, one quenching sequence may be represented:

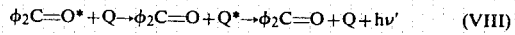  (VIII)

and another may be represented:

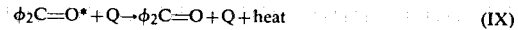  (IX)

where $\phi$ is a phenyl group, Q is the quencher, $h\nu'$ is a photon of longer wavelength, and hence of lesser energy, than the absorbed photon, $h\nu$, of Equation (III) and the asterisk has the meaning previously assigned.

Quenchers used in the present invention are compounds having at least one quenching moiety which quenches the photosensitizer to an extent greater than the extent to which the photosensitizer is quenched by acrylyloxy groups. The quencher is not itself either an effective initiator or an effective inhibitor of free radical polymerization of acrylyloxy groups. It does not produce products during quenching of the photosensitizer which are either effective initiators or effective inhibitors of free radical polymerization of acrylyloxy groups. Moreover, the quencher either does not quench the photoinitiator or it quenches the photoinitiator at a rate much less than the rate at which the photoinitiator induces polymerization of acrylyloxy groups so as not to significantly interfere with initiation of addition polymerization of acrylyloxy groups by a member of the radical pair heretofore discussed. The preferred quenchers used in the present invention have at least one of the following characteristics: (a) a triplet energy in the range of from 35 to 68 kilocalories per mole, but lower than the triplet energy of the photosensitizer employed, (b) an ionization potential in the range of from about 6½ to 9 electron volts, or (c) an ionization potential in the range of from 10½ to about 12 electron volts. Quenchers having an ionization potential in one or the other of the ranges specified in (b) or (c) may or may not have a triplet energy in the range specified in (a).

Examples of photosensitizers which may be used in the present invention are: benzil, 4-phenylbenzophenone, 4-phenylacetophenone, 3,4-methylenedioxyacetophenone, 4-cyanobenzophenone, 4,4'-dichlorobenzophenone, 4-trifluoromethylbenzophenone, 3-methoxybenzophenone, 4-chlorobenzophenone, 3-chlorobenzophenone, 4-methoxybenzophenone, 3,4-dimethylbenzophenone, 4-methylbenzophenone, benzophenone, 2-methylbenzophenone, 4,4'-dimethylbenzophenone, 2,5-dimethylbenzophenone, 2,4-dimethylbenzophenone, 4-cyanoacetophenone, 4-fluorobenzophenone, o-benzoylbenzophenone, 4,4'-dimethoxybenzophenone, b 3,4,5-trimethylacetophenone, 3,5-dimethylacetophenone, 4-bromoacetophenone, 4-methoxyacetophenone, 3,4-dimethylacetophenone, triphenylmethylacetophenone, anthrone, 4-chloroacetophenone, 4-trifluoro-methylacetophenone, ethyl phenylglyoxylate, o-benzoylbenzoic acid, ethyl benzoylbenzoate, dibenzosuberone, o-benzoylbenzophenone, acrylyloxyethyl benzoylbenzoate, 4-acrylyloxybenzophenone, 2-acrylyloxyethoxybenzophenone, 3,3',4,4'-benzophenonetetracarboxylic dianhydride and esters thereof.

The preferred photosensitizer is benzophenone. Mixtures of photosensitizers may be used if desired.

There are many photoinitiators which may be used in the present invention. In the formulae which follow, $\phi$ represents phenyl which is either unsubstituted or substituted to a minor extent with substituents which either will not substantially interfere with the utility of the compound as a photoinitiator or will enhance such utility. Examples of substituents which may often be employed are halo, lower alkyl, lower alkoxy, carboxy and alkoxycarbonyl.

Many photoinitiators which may be used are compounds falling within the formula:

where a is 1, 2 or 3 and X is chloro or bromo. Examples are α,α,α-trichloroacetophenone and p-tert-butyl-α,α,α-trichloroacetophenone.

Other photoinitiators which may be used fall within the formula:

where X is chloro or bromo.

Still other photoinitiators fall within the formula:

where $R_1$ and $R_2$ are each independently alkyl usually having from 1 to 4 carbon atoms. $R_1$ and $R_2$ may be the same or different. Examples include α,α-diethoxyacetophenone and α,α-dibutoxyacetophenone.

Still other useful photoinitiators fall within the formula:

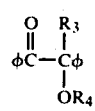

where $R_3$ may be hydrogen, alkyl usually having from 1 to 6 carbon atoms and preferably from 1 to 4 carbon atoms, methylol or alkoxycarbonylalkyl where the alkoxy portion usually contains from 1 to 4 carbon atoms and the alkyl portion usually contains 1 or 2 carbon atoms. $R_4$ is typically alkyl having from 1 to 6 carbon atoms and preferably from 1 to 4 carbon atoms, tetrahydropyranyl, cycloalkyl usually having from 6 to 8 carbon atoms or substituted or unsubstituted phenyl. Examples are methyl benzoin ether, ethyl benzoin ether, isopropyl benzoin ether, butyl benzoin ether, isobutyl benzoin ether, phenyl benzoin ether, 2-tetrahydropyranyl benzoin ether, α-(β-methoxycarbonylethyl)benzoin ethyl ether and α-(β-ethoxycarbonylethyl)benzoin ethyl ether.

Other photoinitiators which are useful fall within the formula:

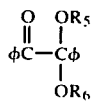

where $R_5$ and $R_6$ are each independently alkyl usually having from 1 to 6 carbon atoms and preferably from 1 to 4 carbon atoms. $R_5$ and $R_6$ may be the same or different. Examples are α,α-diethoxy-α-phenylacetophenone and α,α-dimethoxy-α-phenylacetophenone.

Still other photoinitiators which may be used fall within the formula:

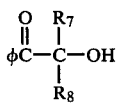

where $R_7$ and $R_8$ are each independently alkyl usually containing from 1 to 4 carbon atoms. $R_7$ and $R_8$ may be the same or different. Examples are α,α-dimethyl-α-hydroxyacetophenone and p-isopropyl-α,α-dimethyl-α-hydroxyacetophenone.

Still other useful photoinitiators fall within the formula:

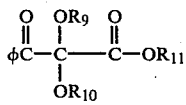

where $R_9$, $R_{10}$ and $R_{11}$ are each independently alkyl usually having from 1 to 4 carbon atoms. $R_9$, $R_{10}$ and $R_{11}$ may be the same or different. Examples are ethyl α,α-diethoxy-α-benzoylacetate and methyl α,α-dimethoxy-α-benzoylacetate.

Other photoinitiators which may be employed fall within the formula:

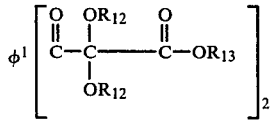

where $\phi^1$ is substituted or unsubstituted phenylene (ortho, meta or para), $R_{12}$ is alkyl usually containing from 1 to 4 carbon atoms and $R_{13}$ is alkyl usually containing from 1 to 18 carbon atoms and preferably from 1 to 8 carbon atoms. Examples are benzene-1,4-bis(ethyl β-oxo-α,α-diethoxypropionate) and benzene-1,4-bis(methyl β-oxo-α,α-dimethoxypropionate).

Other photoinitiators fall within the formula:

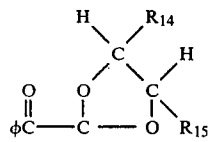

where $R_{14}$ and $R_{15}$ are each independently hydrogen or alkyl usually containing from 1 to 4 carbon atoms. $R_{14}$ and $R_{15}$ may be the same or different. An example is 2-benzoyl-2-phenyl-1,3-dioxolane.

Still other photoinitiators fall within the formula:

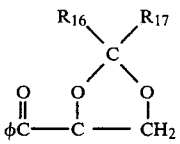

where $R_{16}$ and $R_{17}$ are each independently hydrogen or alkyl usually containing from 1 to 6 carbon atoms, preferably from 1 to 4 carbon atoms. $R_{16}$ and $R_{17}$ may be the same or different. When $R_{16}$ is hydrogen, $R_{17}$ may also be trichloromethyl, p-dimethylaminophenyl, cinnamyl or furyl. Examples are 2-trichloromethyl-4-benzoyl-4-phenyl-1,3-dioxolane, 2-(p-dimethylaminophenyl)-4-benzoyl-4-phenyl-1,3-dioxolane, 2-cinnamyl-4-benzoyl-4-phenyl-1,3-dioxolane, 2-furyl-4-benzoyl-4-phenyl-1,3-dioxolane, 4-benzoyl-4-phenyl-1,3-dioxolane, 2,2-dimethyl-4-benzoyl-4-phenyl-1,3-dioxolane, 2-methyl-2-ethyl-4-benzoyl-4-phenyl-1,3-dioxolane and 2-methyl-4-benzoyl-4-phenyl-1,3-dioxolane.

Other photoinitiators which may be used fall within the formula:

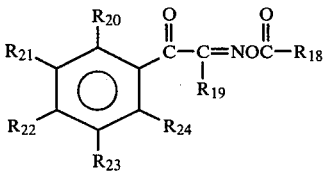

where $R_{18}$ may be alkyl usually having from 1 to about 6 carbon atoms and preferably from 1 to about 4 carbon atoms, alkoxy usually having from 1 to about 6 carbon atoms and preferably from 1 to about 4 carbon atoms, or aryl typically having from 6 to about 12 carbon atoms and preferably from 6 to about 10 carbon atoms. $R_{19}$ may be alkyl typically having from 1 to about 4 carbon atoms or aryl generally having from 6 to about 12 carbon atoms. $R_{20}$, $R_{21}$, $R_{22}$, $R_{23}$ and $R_{24}$ are each independently hydrogen, alkyl usually having from 1 to about 18 carbon atoms and typically from 1 to about 8 carbon atoms, alkoxy usually having from 1 to about 8 carbon atoms and typically from 1 to about 4 carbon atoms, or halo, usually chloro or bromo. $R_{20}$ through $R_{24}$ or any groupings of them, may be the same or different. Examples are 1-phenyl-1,2-propanedione-2-(O-ethoxycarbonyl)oxime and 1-phenyl-1,2-propanedione-2-(O-benzoyl)oxime.

Other photoinitiators fall within the formula:

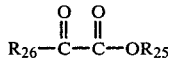

where $R_{25}$ is hydrogen, alkyl usually containing from 1 to about 22 carbon atoms and preferably from 1 to about 12 carbon atoms, benzyl, unsubstituted phenyl, phenyl substituted with one or more minor substituents such as lower alkyl, lower alkoxy, lower aryloxy, lower alkylthio, lower arylthio or halo which is usually chloro or bromo; hydroxyalkyl usually containing from 1 to about 10 carbon atoms; chloroalkyl containing usually from 1 to about 10 carbon atoms, bromoalkyl usually containing from 1 to about 10 carbon atoms, alkoxyalkyl where the alkoxy portion usually contains from 1 to about 4 carbon atoms and where the alkyl portion usually contains from 1 to about 10 carbon atoms or phenoxyalkyl where the alkyl portion usually contains from 1 to about 10 carbon atoms. $R_{26}$ is usually a heterocyclic radical, aryl of from 6 to about 14 carbon atoms, unsubstituted phenyl, phenyl substituted with one or more minor substituents such as lower alkyl, lower alkoxy, lower aryloxy, lower alkylthio, lower arylthio or halo which is usually chloro or bromo. Examples are phenylglyoxylic acid, methyl phenylglyoxylate, ethyl phenylglyoxylate, butyl phenylglyoxylate, tert-butyl phenylglyoxylate, benzyl phenylglyoxylate, butoxyethyl phenylglyoxylate, phenoxyethyl phenylglyoxylate, dodecyl phenylglyoxylate, phenyl phenylglyoxylate, ethyl o-chlorophenylglyoxylate, ethyl p-methylthiophenylglyoxylate, ethyl p-phenylthiophenylglyoxylate, ethyl p-methoxyphenylglyoxylate, ethyl 2-furanglyoxylate and ethyl p-phenoxyphenylglyoxylate.

Mixtures of photoinitiators may be used if desired.

Many of the quenchers having ionization potentials in the range of from about 6½ to 9 electron volts or in the range of 10½ to about 12 electron volts are olefins generally having from about 2 to about 18 carbon atoms, preferably from about 4 to about 10 carbon atoms. Examples of olefinic quenchers are: 1-ethoxy-1-butene, tetraethoxyethylene, 1,1-diethoxyethylene, ethoxyethylene, 2,3-dimethyl-2-butene, 1,2-dicyanoethylene and tetracyanoethylene.

Other quenchers having ionization potentials in the range of from about 6½ to 9 electron volts or in the range of from 10½ to about 12 electron volts are conjugated polyenes usually having from about 4 to about 40 carbon atoms, preferably from about 5 to about 10 carbon atoms. Examples of such conjugated polyenic quenchers are: 2,5-dimethyl-2,4-hexadiene, 1,3-pentadiene and β-carotene.

Still other quenchers having ionization potentials in the range of from about 6½ to 9 electron volts are the alkoxy substituted benzenes and the alkoxy substituted naphthalenes. Examples of alkoxy substituted benzenes are compounds represented by the formula:

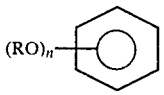

wherein each individual RO on the molecule is lower alkoxy and n is an integer in the range of from 1 to 6. Usually the alkoxy group contains from 1 to 4 carbon atoms. Other minor substituents which do not interfere with the quenching property may be on the molecule. Examples include: methoxybenzene, o-dimethoxybenzene, m-dimethoxybenzene, p-dimethoxybenzene, 1,3,5-trimethoxybenzene, pentamethoxybenzene, hexamethoxybenzene, ethoxybenzene, o-diethoxybenzene, m-diethoxybenzene, p-diethoxybenzene, 1,2,4,5-tetraethoxybenzene and 1-methoxy-3-ethoxybenzene.

Examples of alkoxy substituted naphthalenes are compounds represented by the formula:

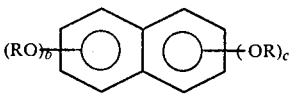

wherein each individual RO on the molecule is lower alkoxy, b is an integer in the range of from 1 to 4 and c is an integer in the range of from 0 to 4. Usually the alkoxy group contains from 1 to 4 carbon atoms. Other minor substituents which do not interfere with the quenching property may be on the molecule. Examples include: 1,3-dimethoxy-naphthalene, 1,4-dimethoxynaphthalene, 1,5-dimethoxynaphthalene, 1,6-dimethoxynaphthalene, 1,7-dimethoxynaphthalene, 1,8-dimethoxy-naphthalene, 2,3-dimethoxynaphthalene, 2,6-dimethoxynaphthalene, 2,7-dimethoxynaphthalene, 2,3,6,7-tetramethoxynaphthalene, 1,3-diethoxy-naphthalene, 1,4-diethoxynaphthalene, 1,5-diethoxynaphthalene, 1,6-diethoxynaphthalene, 1,7-diethoxynaphthalene, 2,3-diethoxynaphthalene, 2,6-diethoxynaphthalene, 2,7-diethoxynaphthalene, 2,3,6-triethoxynaphthalene and 2-methoxy-6-ethoxynaphthalene.

Examples of quenchers having a triplet energy in the range of from 35 to 68 kilocalories per mole include: perylene, 9,10-dichloroanthracene, 9,10-diphenylanthracene, 3,4-benzopyrene, 1-chloranthracene, anthracene, 1,12-benzperylene, trans-1,3,5-hexatriene, 1,2-benzanthracene, pyrene, pentaphene, diphenyltetraacetylene, trans-stilbene, 1,2,3,4-dibenzanthracene, 1,2,5,6-dibenzanthracene, 1,3-cyclohexadiene, 1,2,7,8-dibenzoanthracene, 1,2-benzopyrene, fluoranthene, 1,2-benzochyrsene, cyclopentadiene, 9-acetylphenanthrene, p-terphenyl, 1-iodonaphthalene, 2-phenylnaphthalene, 1-phenylnaphthalene, 3,4-benzophenanthrene, 3-acetylphenanthrene, 1-bromonaphthalene, 1-chloronaphthalene, 2-naphthonitrile, acenaphthene, trans-1,3-pentadiene, 2-naphthaldehyde, 2-naphthoic acid, 1-acetylnaphthalene, 2-acetylnaphthalene, 2-benzoylnaphthalene, 2,4-hexadien-1-ol, 1-methylnaphthalene, 1-methoxynaphthalene, 1,3-butadiene, 1-fluoronaphthalene, isoprene, tetraacetylene glycol, diethyltetraacetylene, coronene, 3,4-benzofluorene, diphenyltriacetylene, 2,2'-binaphthyl, 1-naphthaldehyde, 5,6-benzochry-sene, 1-acetylnaphthalene, 3,4,5,6-dibenzophenanthrene, cis-stilbene, chrysene, 1,2-benzofluorene, 2,3-benzofluorene, 1-benzoylnaphthalene, 1-naphthonitrile, 1-naphthoic acid, diphenyldiacetylene, 1,2,6,7-dibenzopyrene, 2-iodonaphthalene, 2-bromonaphthalene, 2-chloronaphthalene, 2-methylnaphthalene, naphthalene, o-terphenyl, phenanthrene, diphenyl-acetylene, 4,4'-dichlorobiphenyl, triacetylene glycol, 2,4,6-octatriyne, m-terphenyl, 2-bromobiphenyl, biphenyl and fluorene.

Examples of quenchers which are polymerizable monomers and which have a triplet energy in the range of from 35 to 68 kilocalories per mole, an ionization potential in the range of from about 6½ to 9 electron volts or in the range of from 10½ to about 12 electron volts or have both a triplet energy in the stated range and an ionization potential in one of the stated ranges, include: N-vinyl-2-pyrrolidone, N-vinylcaprolactam, N-vinylcarbazole and styrene.

The quenching moiety may be part of a polymerizable molecule having acrylyloxy functionality, for example: 2-phenoxyethyl acrylate, α-naphthyl acrylate and β-naphthyl acrylate.

Mixtures of quenchers may be used if desired.

Useful compounds having a plurality of acrylyloxy groups and capable of being free radically addition polymerized by interaction with the photoinitiator and the photosensitizer are numerous and include divalent, trivalent, tetravalent and higher polyvalent organic radicals whose bonds are satisfied with unsubstituted acrylyloxy or α-substituted acrylyloxy groups. The polyvalent radical may be aliphatic, cycloaliphatic or aromatic. Examples of these compounds are the diacrylates and dimethacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, propylene glycol, neopentyl glycol, 5,5-dimethyl-3,7-dioxanonane-1,9-diol, 2,2-dimethyl-3-hydroxypropyl 2,2-dimethyl-3-hydroxypropionate, Bisphenol A diglycidyl ether, 1,4-butanediol diglycidyl ether and neopentyl glycol diglycidyl ether; the triacrylates, trimethacrylates diacrylates and dimethacrylates of glycerol, 1,1,1-trimethylolpropane and trimethylolethane; and the tetraacrylates, tetramethacrylates, triacrylates, trimethacrylates, diacrylates and dimethacrylates, of pentaerythritol and erythritol. The acrylyloxy groups of the molecules are usually the same, but they may be different as exemplified by the compound 2,2-dimethyl-1-acrylyloxy-3-methacrylyloxypropane.

Further examples of satisfactory polyacrylyloxy compounds include polyacrylyloxy functional polyesters, polyamides, polyacrylates, polyethers, polycarbonates or polyurethanes as well as polyacrylyloxy functional compounds of mixed functionality such as polyacrylyloxy functional poly(ester-urethanes), poly(ester-amides) and poly(ether-urethanes).

Many of the above polyacrylyloxy compounds and others are described in the following U.S. Pat. Nos. 3,455,801; 3,455,802; 3,470,079; 3,471,386; 3,483,104; 3,485,733; 3,509,234; 3,619,260; 3,645,984; 3,647,737; 3,676,398; 3,700,643; 3,968,016; 3,979,426; 4,017,652; 4,024,296; 4,024,297; 4,037,112; 4,064,2; 4,108,840 and 4,130,708. The disclosures of these patents are incorporated herein by reference.

Still other examples of polyacrylyloxy compounds are amide acrylates such as are described in application Ser. No. 821,856, filed Aug. 4, 1977, amine amide acrylates such as are described in application Ser. No. 858,973, filed Dec. 9, 1977, and urethane amide acrylates such as are described in application Ser. No. 890,895, filed Mar. 28, 1978 and now U.S. Pat. No. 4,153,776 and in application Ser. No. 891,426, filed Mar. 28, 1978 now U.S. Pat. No. 4,187,366. The disclosures of these applications are incorporated herein by reference.

Mixtures of compounds having a plurality of acrylyloxy groups may be used, if desired.

Monomer having monoacrylic functionality which crosslinks with the compound having polyacrylyloxy functionality may optionally be present in the coating composition. Examples of monoacrylic functional monomers which may be used are methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate. The preferred monoacrylic functional monomers are liquid compounds miscible with the polyacrylyloxy compound. The use of one or more monoacrylic functional monomers is desirable because the greater mobility of the smaller monomer molecule, as compared to the larger polyacrylyloxy functional molecule, allows crosslinking to proceed faster than if the monoacrylic functional monomer were absent. Another benefit is that the monoacrylic functional monomer usually acts as a reactive solvent for the polyacrylyloxy functional compound thereby providing coating compositions having a satisfactory low viscosity without using an inordinate amount, if any at all, of volatile, nonreactive solvent.

The monoacrylic functional monomer, or mixtures of monoacrylic functional monomers, may be employed over a broad range. At the lower end of the range, no monoacrylic functional monomer need be used. The amount of such monomer when used should be sufficient to provide a liquid, flowable, interpolymerizable mixture. When used, the monomer will ordinarily be present in the coating composition in the range of from about 1 to about 80 percent by weight of the binder of the coating composition. Typically, the monoacrylic functional monomer will ordinarily be present in the range of from about 15 to about 30 percent by weight of the binder.

Pigments are optional ingredients which are often included in the coating composition. Examples of opacifying pigments include titanium dioxide (rutile or anatase), zinc oxide, zirconium oxide, zinc sulfide and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow, toluidine red, aluminum powder and aluminum flakes. Examples of extender pigments include silica, barytes, calcium carbonate, barium sulfate, talc, aluminum silicates, sodium aluminum silicates, potassium aluminum silicates and magnesium silicate. A single pigment may be used or mixtures of pigments may be employed. When the pigment is ultraviolet light absorbing, it should be used in amounts which do not preclude curing of the interior of the coating. The maximum amount is therefore related to the thickness of the coating to be cured. Thin coatings may tolerate more ultraviolet light absorbing pigment than thick coatings. When the pigment does not significantly absorb ultraviolet light, there is usually greater latitude in the amounts which may be employed. When pigment is used, it is generally present in an amount in the range of from about 0.1 to about 70 percent by weight of the coating composition. Often it is present in an amount in the range of from about 0.5 to about 50 percent. Usually it is present in an amount in the range of from about 1 to about 35 percent by weight of the coating composition.

Dyes and tints may optionally be included in the coating composition in conventional amounts.

Another optional ingredient is resinous pigment dispersant or grinding vehicle. There are many resinous dispersants which are commercially available for that purpose. These dispersants are used in the manner and in amounts known to the art.

Conventional plasticizers such as dibutyl phthalate, butyl benzyl phthalate, diisooctyl phthalate, decyl butyl phthalate, diisooctyl adipate, dibutyl sebacate, butyl benzoate, triisooctyl trimellitate, n-octyl n-decyl trimellitate, and tricresyl phosphates and flow promoters such as phenyl benzoate, dibenzyl ketone, benzyl methyl ketone and the like may also be optionally included in amounts customary in the art.

Any of the conventional viscosity control agents may be optionally employed in the composition. The preferred materials are resinous or polymeric viscosity control agents. Many of these resinous materials are available. Illustrative of such materials are cellulose acetate butyrate and the like. These viscosity control agents are used in the manner and in amounts known to the art.

Another optional ingredient which is often included in the coating composition is an inert volatile organic solvent. Mixtures of several inert volatile solvents may be used when desired. Examples of suitable inert volatile organic solvents are acetone, methyl ethyl ketone, methyl isobutyl ketone, methyl alcohol, ethyl alcohol, propyl alcohol, isoproyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. When solvent of this type is used it is ordinarily present in the coating composition in the range of from about 0.1 to about 40 percent by weight of the vehicle of the coating composition. From about 1 to about 15 percent is typical.

The listing of optional ingredients discussed above is by no means exhaustive. Other ingredients may be employed in their customary amounts for their customary purposes so long as they do not seriously interfere with good coatings practice or the obtaining of cured coatings of low gloss.

The coating compositions of the invention are usually prepared by simply admixing the various ingredients. The compounds comprising the photocatalyst system may be premixed and then admixed with the other ingredients of the coating composition or they may be added separately. Although mixing is usually accomplished at room temperature, elevated temperatures are sometimes used. The maximum temperature which is usable depends upon the heat stability of the ingredients. Temperatures above about 200° C. are only rarely employed.

The ultraviolet light curable coating compositions of the invention are generally used to form cured adherent coatings on substrates. The substrate is coated with the coating composition using substantially any technique known to the art. These include spraying, curtain coating, dipping, roller application, printing, brushing, drawing and extrusion. The coated substrate is then exposed to ultraviolet light to cure the coating into a crosslinked film.

The amount of photosensitizer present in the ultraviolet light curable coating compositions of the invention may be widely varied. Usually the photosensitizer is present in an amount in the range of from about 0.01 percent of about 50 percent by weight based on the weight of the binder of the coating composition. More often an amount in the range of from about 0.1 percent to about 20 percent is employed. From about 0.5 to about 10 percent by weight based on the weight of the binder is preferred.

The amount of photoinitiator present in the coating composition may also be widely varied. Ordinarily the photoinitiator is present in an amount in the range of from about 0.01 percent to about 10 percent by weight based on the weight of the binder of the coating composition. Most often an amount in the range of from about 0.05 percent to about 7 percent is used. From about 0.1 percent to about 5 percent by weight based on the weight of the binder is preferred.

The amount of quencher present in the coating composition is similarly subject to wide variation. Usually the quencher is present in an amount in the range of from about 0.01 percent to about 90 percent by weight based on the weight of binder of the coating composition. When the quencher is not a monomer it is ordinarily present in an amount in the range of from about 0.01 percent to about 20 percent by weight based on the weight of binder of the coating composition. Most often an amount in the range of from about 0.02 percent to about 10 percent is used. From about 0.05 percent to about 5 percent by weight based on the weight of the binder is preferred. When the quencher is a monomer, or is a combination of monomer and non-monomer, it is generally present in an amount in the range of from about 0.01 to about 90 percent by weight based on the binder of the coating composition. Typically an amount in the range of from about 0.1 to about 75 percent is used. From about 1 to about 50 percent by weight of the binder is preferred.

The amount of polymerizable compound having a plurality of acrylyloxy groups present in the coating composition is subject to wide variation. The compound is ordinarily present in an amount in the range of from about 10 to 99 percent by weight based on the weight of the binder of the coating composition. An amount in the range of from about 20 to 97 percent is typical. From about 30 to 95 percent by weight of the binder is preferred.

Cured coatings of the ultraviolet light curable coating composition of the invention usually have thicknesses in the range of from about 0.1 to about 100 mils. More often they have thicknesses in the range of from about 0.3 to about 10 mils.

Any suitable source which emits ultraviolet light, viz., electromagnetic radiation having a wavelength in the range of from about 180 to about 400 nanometers, may be used in the practice of this invention. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431.

The time of exposure to ultraviolet light and the intensity of the ultraviolet light to which the coating composition is exposed may vary greatly. Generally the exposure to ultraviolet light should continue until either the film is thermoset throughout or at least cured to the point where subsequent "dark reactions" caused the film to become thermoset throughout. Exposure of the coating to ultraviolet light may be accomplished in the presence of an inert atmosphere, viz., an atmosphere either containing no oxygen or only a concentration of oxygen which insignificantly inhibits polymerization of the coating surface. Gases such as nitrogen, argon, carbon dioxide or mixtures thereof are typically the major components of inert atmospheres, although other unreactive gases may be used. Nitrogen is generally employed for this purpose. In many cases where the coating composition is such that polymerization is not significantly susceptible to oxygen inhibition, exposure to ultraviolet light may be conducted in air.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chronium, zinc and alloys.

Gloss may conveniently be determined by the Standard Method of Test for Specular Gloss, ASTM Designation D-523-67 (Reapproval 1972).

Although it is not desired to be bound by any theory, it is believed that the enhanced flatting is obtained by a microwrinkling of the surface of the coating. The microwrinkling is thought to be due to a retardation of cure in the interior of the film relative to cure in the surface layer caused by a preferential and selective quenching of the photosensitizer by the quencher. More specifically, it is believed that this occurs as follows: During exposure of a coating of radiation curable coating composition to ultraviolet light, the ultraviolet light intensity diminishes in a fashion which is generally exponential with depth. There is essentially complete absorption of 200 to 300 nanometer ultraviolet light in the surface layer of the coating where both the photoinitiator and the photosensitizer produce large numbers of free radicals. The quencher reduces the number of free radicals which would be produced in the absence of the quencher, but the net effect is small because of the large excess of available free radicals. In the lower portion of the coating, the concentration of free radicals is many times lower because the remaining 300 to 400 nanometer ultraviolet light is only weakly absorbed by the photoinitiator and photosensitizer. The quencher again reduces the number of free radicals produced by reactions of the photosensitizer, but because the concentration of free radicals is low, the net effect is considerable. Therefore, the quenchable photosensitizer and the substantially non-quenchable photoinitiator both produce significant quantities of free radicals in the surface layer which are available for initiation, whereas in the lower layer, the substantially non-quenchable photoinitiator produces most of the free radicals available for initiation. The large concentration of free radicals permits the surface layer to be cured at least to the point where it tends to resist flow while the lower portion of the coating is still fluid. Thereafter, as the lower portion cures, it shrinks causing the surface layer to form microwrinkles. If the lower portion of the coating cures too quickly in relation to the curing rate of the surface layer, the lower portion shrinks while the surface layer is still fluid and the microwrinkling effect is reduced or eliminated. The quencher and its cooperation with the photosensitizer and the photoinitiator is therefore seen to produce the delay in curing of the lower portion necessary to induce microwrinkling. Nevertheless, because the delay is not gross, films of low gloss may be produced by a single pass through an ultraviolet light processor at reasonable line speeds which are generally suitable for commercial production.

In the illustrative examples which follow, all parts are parts by weight and percentages are percent by weight unless otherwise specified.

EXAMPLE I

Into a reaction vessel equipped with an agitator, a heater, cooling means, a thermometer and refluxing condenser, there is charged 529 parts N-methylethanolamine. The amine is heated to about 99° C. With the temperature of the amine maintained at 96°–99° C., 615 parts γ-butyrolactone is added gradually to the reaction vessel, approximately 9 parts being added every minute. The temperature of the reaction mixture is maintained at 99°–102° C. for about six hours with periodic viscosity checks being made on 100 percent samples. A final viscosity of R is obtained after which the amide diol intermediate reaction product is cooled to about 52° C. and then placed in a storage container.

Into a reaction vessel equipped as above, there is charged 809 parts bis(4-isocyanatocyclohexyl)methane ("Hylene W"; DuPont), 618 parts 2-ethylhexyl acrylate, 0.48 part dibutyltin dilaurate ("Niax" catalyst; Union Carbide Corp.) and 0.05 part phenothiazine. An air sparge is applied below the surface of the reaction mixture and a nitrogen blanket is established above the mixture. The reaction mixture is heated from 21° C. to about 40° C. in a 55-minute period, after which time the nitrogen blanket and air sparge are removed. Then over a two hour period there is added to the reaction vessel a blend of 663 parts of a polycarprolactone polyol having a hydroxyl value of 216 (PCP 0200; Union Carbide Corporation) and 143 parts of the previously prepared amide diol intermediate. The temperature of the reaction mixture is observed to vary during the two-hour addition period from about 42° C. to about 52° C. The reaction mixture is held at about 52° C. for two hours, after which time a viscosity check is made on a sample of the reaction mixture diluted to 75 percent concentration in toluene and is found to be V+. The reaction mixture is then heated to about 63° C. and held at that temperature for one hour and 45 minutes, after which time a viscosity of V+ is obtained for a sample taken as before. The reaction mixture is heated to about 68° C. during a one hour and 5 minute holding period. Then a blend of 4.5 parts hydroxyethyl acrylate and 2.3 parts di-t-butyl-p-cresol ("Ionol" inhibiting agent; Shell Oil Company) is added to the reaction vessel. Over a 30-minute period 254 parts hydroxyethyl acrylate is added to the reaction mixture, after which time the temperature is observed to be 69° C. and a viscosity measurement of V+ is obtained for a sample taken as before. The reaction mixture is then maintained at 75°–76° C. for two hours and 45 minutes during which time viscosity measurements of V− and V+ are obtained. Then 24.5 parts glacial acrylic acid is added to the reaction mixture and after 45 minutes a viscosity of V+ is obtained for a sample diluted to 75 percent concentration in 2-ethoxyethanol. The amide urethane acrylate reaction product is cooled to about 52° C. and filtered through a nylon bag into a storage container.

A base composition is prepared by admixing 245 parts of the above amide urethane reaction product, 175 parts of the diacrylate of 1,6-hexanediol, 70 parts of the diacrylate of triethyleneglycol, 28 parts benzophenone, 7 parts α,α-dimethoxy-α-phenylacetophenone and 35 parts silica pigment (Syloid 74; W. R. Grace & Co.).

A plurality of coating compositions is prepared by admixing various amounts of the above base composition, 2-(2-ethoxyethoxy)ethyl acrylate and naphthalene. A control coating composition is prepared in the same manner, but omitting the naphthalene. Each coating composition is drawn down on a printed poly(vinyl chloride) film using a No. 014 wire wound bar. The coatings are then cured by passing the coated films once, in air, through an ultraviolet light processor containing four medium pressure, ultraviolet light emitting, mercury vapor lamps. The 60° and 85° gloss values are then determined generally using the procedure of ASTM Designation D-523-67 (Reapproval 1972). The proportions of materials, the rates at which the coated films are passed through the processor and the gloss values are shown in Table 1.

TABLE 1

| | Coating Composition | | | | |
|---|---|---|---|---|---|
| | 1A | 1B | 1C | 1D | 1E |
| Base Composition, parts | 40 | 50 | 50 | 50 | 50 |
| 2-(2-Ethoxyethoxy)ethyl Acrylate, parts | 10 | 10 | 10 | 10 | 10 |
| Naphthalene, parts | 0 | 0.05 | 0.5 | 1.0 | 2.5 |
| Conveyor Speed, meters/minute | 24.4 | 24.4 | 24.4 | 21.3 | 15.2 |
| 60° Gloss, percent reflectance | 30 | 28 | 22 | 15 | 12 |
| 85° Gloss, percent reflectance | 50 | 47 | 29 | 16 | 9 |

EXAMPLE II

An intermediate composition is prepared by admixing 122.5 parts of the amide urethane reaction product of Example I, 87.5 parts of the diacrylate of 1,6-hexanediol, 35 parts of the diacrylate of triethyleneglycol, 14 parts benzophenone, 3.5 parts α,α-dimethoxy-α-phenylacetophenone and 17.5 parts silica pigment (Syloid 74). After dispersing the silica pigment, the intermediate composition is admixed with 56 parts 2-(2-ethoxyethoxy)ethyl acrylate to form a base composition.

A plurality of coating compositions are prepared by admixing portions of the above base composition with various amounts of naphthalene or with naphthalene and styrene. Each coating composition is drawn down on a printed poly(vinyl chloride) film using a No. 014 wire wound bar. The coatings are then cured, in air, in the manner of Example I and the 60° and 85° gloss values are determined, also in the manner of Example I. The proportions of materials, the rates at which the coated films are passed through the processor and the gloss values are shown in Table 2. Coating Composition 1A of Example 1 is used as the control.

TABLE 2

| | Coating Composition | | | | |
|---|---|---|---|---|---|
| | 2A | 2B | 2C | 2D | 2E |
| Base Composition, parts | 60 | 60 | 60 | 60 | 60 |
| Naphthalene, parts | 0 | 0 | 0 | 0 | 1.0 |
| Styrene, parts | 0.05 | 0.5 | 1.0 | 2.5 | 1.0 |
| Conveyor Speed, meters/minute | 24.4 | 21.3 | 18.3 | 15.2 | 15.2 |
| 60° Gloss, percent reflectance | 27 | 20 | 18 | 14 | 8 |
| 85° Gloss, percent reflectance | 45 | 26 | 23 | 22 | 9 |

EXAMPLE III

A base composition is prepared by admixing 122.5 parts of the amide urethane reaction product of Example I, 87.5 parts of the diacrylate of 1,6-hexanediol, 35 parts of the diacrylate of triethyleneglycol, 14 parts benzophenone, 3.5 parts α,α-dimethoxy-α-phenylacetophenone, 17.5 parts silica pigment (Syloid 74) and 56 parts 2-(2-ethoxyethoxy)ethyl acrylate.

A plurality of coating compositions are prepared by admixing 50 parts of the above base composition with 1 part of a quencher. The base composition is used as a control. Each coating composition is drawn down on a printed poly(vinyl chloride) film using a No. 014 wire wound bar. The coatings are the cured by passing the coated films once, in air at 18.3 meters per minute, through two ultraviolet light processors in succession, each containing one medium pressure, ultraviolet light emitting, mercury vapor lamp. The 60° and 85° gloss values are then determined in the manner of Example I. The identity of the quenchers and the gloss values are shown in Table 3.

TABLE 3

| Quencher | 60° Gloss, percent reflectance | 85° Gloss, percent reflectance |
|---|---|---|
| Benzaldehyde | 28 | 42 |
| Fluorene | 19 | 30 |
| Styrene | 18 | 22 |
| Naphthalene | 14 | 14 |
| Triphenylene | 13 | 13 |
| Triphenylamine | 15 | 15 |
| Maleic Anhydride | 16 | 24 |
| 1,2,4,5-Benzenetetracarboxylic Dianhydride | 20 | 32 |
| None (Control) | 36 | 55 |

EXAMPLE IV

A base composition is prepared by admixing 393.3 parts of the amide urethane reaction product of Example I, 280.8 parts of the diacrylate of 1,6-hexanediol, 112.5 parts of the diacrylate of triethyleneglycol, 45.0 parts benzophenone and 4.5 parts α,α-dimethoxy-α-phenylacetophenone.

Three coating compositions are prepared by admixing portions of the above base composition with various materials. Six other coating compositions are prepared by admixing a portion of one of the first three coating compositions with naphthalene or styrene. Each coating composition is drawn down on printed poly(vinyl chloride) films using a No. 014 wire wound bar. The coatings are then cured by exposing them to ultraviolet light. This is accomplished by passing some of the coated films once, in air at 12.2 meters per minute, through two ultraviolet light processors in succession, each containing two medium pressure, ultraviolet light emitting, mercury vapor lamps and by passing others of the coated films twice, in a nitrogen atmosphere containing less than 100 parts oxygen per million parts atmosphere by volume and at a speed of 12.2 meters per minute, through one ultraviolet light processor containing two medium pressure, ultraviolet light emitting, mercury vapor lamps. The 60° and 85° gloss values are then determined in the manner of Example I. The identity of the materials, their proportions and the gloss values are shown in Tables 4 and 5.

TABLE 4

| | Coating Composition | | |
|---|---|---|---|
| | 4A | 4B | 4C |
| Base Composition, parts | 278.7 | 278.7 | 278.7 |
| N-Vinyl-2-pyrrolidone, parts | 60.0 | 0 | 0 |

TABLE 4-continued

|  | Coating Composition | | |
|---|---|---|---|
|  | 4A | 4B | 4C |
| 2-(2-Ethoxyethoxy)ethyl Acrylate, parts | 0 | 0 | 60.0 |
| 2-Phenoxyethyl Acrylate, parts | 0 | 60.0 | 0 |
| Cured in Air | | | |
| 60° Gloss, percent reflectance | 53 | 72 | 82 |
| 85° Gloss, percent reflectance | 55 | 72 | 86 |
| Cured in Nitrogen | | | |
| 60° Gloss, percent reflectance | 74 | 88 | 70 |
| 85° Gloss, percent reflectance | 88 | 93 | 77 |

TABLE 5

|  | Coating Composition | | | | | |
|---|---|---|---|---|---|---|
|  | 4D | 4E | 4F | 4G | 4H | 4J |
| Composition 4A, parts | 50.0 | 0 | 0 | 50.0 | 0 | 0 |
| Composition 4B, parts | 0 | 50.0 | 0 | 0 | 50.0 | 0 |
| Composition 4C, parts | 0 | 0 | 50.0 | 0 | 0 | 50.0 |
| Naphthalene, parts | 1.0 | 1.0 | 1.0 | 0 | 0 | 0 |
| Styrene, parts | 0 | 0 | 0 | 1.0 | 1.0 | 1.0 |
| Cured in Air | | | | | | |
| 60° Gloss, percent reflectance | 65 | 75 | 77 | 34 | 32 | 55 |
| 85° Gloss, percent reflectance | 70 | 79 | 80 | 43 | 43 | 58 |
| Cured in Nitrogen | | | | | | |
| 60° Gloss, percent reflectance | 65 | 80 | 74 | 2 | 1.5 | 1.5 |
| 85° Gloss, percent reflectance | 61 | 84 | 81 | 6 | 3 | 2.5 |

EXAMPLE V

A base composition is prepared by admixing 509.6 parts of the amide urethane reaction product of Example I, 364.0 parts of the diacrylate of 1,6-hexanediol and 145.6 parts of the diacrylate of triethyleneglycol.

A plurality of coating compositions are prepared by admixing portions of the above base composition with various materials. Each coating composition is drawn down on printed poly(vinyl chloride) film using a No. 014 wire wound bar. The coatings are then cured by passing the coated films once, in air at 12.2 meters per minute, through two ultraviolet light processors, in succession, each containing two medium pressure, ultraviolet light emitting, mercury vapor lamps. The 60° and 85° gloss values are then determined in the manner of Example I. The identity of the materials, their proportions and the gloss values are shown in Table 6.

TABLE 6

|  | Coating Composition | | | | | | | | | | | | | |
|---|---|---|---|---|---|---|---|---|---|---|---|---|---|---|
|  | 5A | 5B | 5C | 5D | 5E | 5F | 5G | 5H | 5J | 5K | 5L | 5M | 5N | 5P |
| Base Composition, parts | 72.8 | 72.8 | 72.8 | 72.8 | 72.8 | 72.8 | 72.8 | 72.8 | 72.8 | 72.8 | 72.8 | 72.8 | 72.8 | 72.8 |
| N-Vinyl-2-pyrrolidone, parts | 16.6 | 16.6 | 16.6 | 16.6 | 16.6 | 16.6 | 0 | 0 | 0 | 0 | 0 | 0 | 16.6 | 0 |
| 2-(2-Ethoxyethoxy)-ethyl Acrylate, parts | 0 | 0 | 0 | 0 | 0 | 0 | 16.6 | 16.6 | 16.6 | 16.6 | 16.6 | 16.6 | 0 | 16.6 |
| Benzophenone, parts | 0 | 0 | 0 | 0 | 0 | 0 | 0 | 0 | 0 | 0 | 0 | 0 | 4.2 | 4.2 |
| 4,4'-Dimethylbenzophenone, parts | 4.2 | 4.2 | 0 | 0 | 0 | 0 | 4.2 | 4.2 | 0 | 0 | 0 | 0 | 0 | 0 |
| 4-Chlorobenzophenone, parts | 0 | 0 | 4.2 | 4.2 | 0 | 0 | 0 | 0 | 4.2 | 4.2 | 0 | 0 | 0 | 0 |
| 3,3',4,4'-Benzophenonetetracarboxylic Dianhydride, parts | 0 | 0 | 0 | 0 | 4.2 | 4.2 | 0 | 0 | 0 | 0 | 4.2 | 4.2 | 0 | 0 |
| α,α-Dimethoxy-α-phenylacetophenone, parts | 1.0 | 1.0 | 1.0 | 1.0 | 1.0 | 1.0 | 1.0 | 1.0 | 1.0 | 1.0 | 1.0 | 1.0 | 1.0 | 1.0 |
| Silica Pigment (Syloid 74), parts | 5.2 | 5.2 | 5.2 | 5.2 | 5.2 | 5.2 | 5.2 | 5.2 | 5.2 | 5.2 | 5.2 | 5.2 | 5.2 | 5.2 |
| Styrene, parts | 0 | 1.996 | 0 | 1.996 | 0 | 1.996 | 0 | 1.996 | 0 | 1.996 | 0 | 1.996 | 0 | 0 |
| 60° Gloss, percent reflectance | 16 | 8 | 21 | 9 | 31 | 24 | 17 | 11 | 39 | 15 | 45 | 33 | 20 | 34 |
| 85° Gloss percent reflectance | 23 | 9 | 28 | 9 | 36 | 34 | 17 | 8 | 62 | 15 | 70 | 57 | 28 | 52 |

EXAMPLE VI

A base composition is prepared by admixing 72.8 parts of the amide urethane product of Example I, 52.0 parts of the diacrylate of 1,6-hexanediol, 20.8 parts of the diacrylate of triethyleneglycol, 33.2 parts N-vinyl-2-pyrrolidone, 8.4 parts benzophenone and 10.4 parts silica pigment (Syloid 74).

A plurality of coating compositions are prepared by admixing portions of the base composition with various materials. Each coating composition is drawn down or printed poly(vinyl chloride) film using a No. 014 wire wound bar. The coatings are then cured by passing the coated film once, in air at 12.2 meters per minute, through an ultraviolet light processor containing four medium pressure, ultraviolet light emitting, mercury vapor lamps. The 60° and 85° gloss values are then determined in the manner of Example I. The identity of the materials, their proportions and the gloss values are shown in Table 7.

TABLE 7

|  | Coating Composition | | |
|---|---|---|---|
|  | 6A | 6B | 6C |
| Base Composition, parts | 50 | 50 | 50 |
| Methyl Phenylglyoxylate, parts | 0.5 | 0 | 0 |

TABLE 7-continued

| | Coating Composition | | |
|---|---|---|---|
| | 6A | 6B | 6C |
| Oxime Ester Photoinitiator (Q 213; American Cyanamid Co.), parts | 0 | 0.5 | 0 |
| Ketone Photoinitiator (EM 1173; EM Laboratories, Inc.), parts | 0 | 0 | 0.5 |
| 60° Gloss, percent reflectance | 6 | 26 | 14 |
| 85° Gloss, percent reflectance | 5 | 46 | 18 |

EXAMPLE VII

A reactor equipped with an agitator, a thermometer, a heater, a cooler, a total reflux condenser, a source of air and a source of nitrogen is charged with 1067.5 parts bis(4-isocyanatocyclohexyl)methane, 992.9 parts 2-ethylhexyl acrylate, 0.32 part dibutyl tin dilaurate, 2.2 parts 2,6-di-tert-butyl-4-methylphenol and 19.5 parts methyl isobutyl ketone. A slow stream of air is introduced below the liquid surface of the charged materials and a slow stream of nitrogen is introduced above the liquid surface. The heater is then turned on. One hour later when the temperature has reached 40° C., the addition of 1657 parts of a polycaprolactone diol (reaction product of $\epsilon$-caprolactone and diethylene glycol; molecular weight 530; Niax Polyol PCP-0200, Union Carbide Corporation) is begun. The cooler is used as needed to maintain the temperature in the range of from 40° C. to 41.1° C. during the addition. Three hours after beginning the addition, the temperature is 41.1° C., and the addition is completed. The heater is then turned on and fifteen minutes later the temperature is 48.9° C. The temperature is then held in the range of from 48.9° C. to 51.7° C. for two hours. At the conclusion of this period the temperature is 51.7° C. Further heat is applied and forty-five minutes later the temperature is 60° C. The temperature is then held in the range of from 60° C. to 62.8° C. for one hour. At the conclusion of this period the temperature is 62.8° C. There is then added 234.2 parts 2-hydroxyethyl acrylate and 0.32 part 2,6-di-tert-butyl-4-methylphenol. Further heat is applied and thirty minutes later the temperature is 68.3° C. The temperature is held at 68.3° C. for thirty minutes after which the addition of 234.5 parts N-vinyl-2-pyrrolidone and 414.0 parts 2-ethylhexyl acrylate is begun. Twenty minutes later the temperature is 70° C. and the addition is completed. Thirty minutes later the temperature is 71.1° C. and cooling is applied. Two hours and forty minutes later the temperature is 51.7° C. and the reaction product is filtered to yield a urethane acrylate composition.

A plurality of coating composition is prepared by admixing various materials. Each coating composition is drawn down on printed poly(vinyl chloride) films using a No. 014 wire wound bar. The coatings are then cured by exposing them to ultraviolet light. This is accomplished by passing some of the coated film once, in air at 12.2 meters per minute, through two ultraviolet light processors in succession, each containing two medium pressure, ultraviolet light emitting, mercury vapor lamps and by passing others of the coated films once, in air at 36.6 meters per minute, through two ultraviolet light processors in succession, each containing two medium pressure, ultraviolet light emitting, mercury vapor lamps. The 60° and 85° gloss values are then determined in the manner of Example I. The identity of the materials and their proportions are shown in Table 8. The gloss values are shown in Table 9.

TABLE 8

| | Coating Composition | | | | | |
|---|---|---|---|---|---|---|
| | 7A | 7B | 7C | 7D | 7E | 7F |
| Amide Urethane Reaction Product of Example I, parts | 32 | 32 | 47 | 32 | 47 | 0 |
| Urethane Acrylate Composition, parts | 15 | 15 | 0 | 15 | 0 | 47 |
| Diacrylate of 1,6-Hexanediol, parts | 12 | 0 | 15 | 18 | 12 | 12 |
| Tetrahydrofurfuryl Acrylate, parts | 0 | 0 | 0 | 12 | 0 | 12 |
| N-Vinyl-2-pyrrolidone, parts | 12 | 12 | 12 | 12 | 15 | 18 |
| Diacrylate of Triethyleneglycol, parts | 18 | 18 | 0 | 0 | 0 | 0 |
| 2-Ethylhexyl Acrylate, parts | 0 | 12 | 0 | 0 | 0 | 0 |
| 2-Phenoxyethyl Acrylate, parts | 0 | 0 | 15 | 0 | 15 | 0 |
| Benzophenone, parts | 4 | 4 | 4 | 4 | 4 | 4 |
| α,α-Dimethoxy-α-phenylacetophenone, parts | 1 | 1 | 1 | 1 | 1 | 1 |
| Silica Pigment (Syloid 74), parts | 5 | 5 | 5 | 5 | 5 | 5 |
| Synthetic Wax (S379N; Shamrock Chemicals Corp.), parts | 1 | 1 | 1 | 1 | 1 | 1 |

TABLE 9

| | Coating Composition | | | | | |
|---|---|---|---|---|---|---|
| | 7A | 7B | 7C | 7D | 7E | 7F |
| Conveyor Speed, 12.2 meters/minute | | | | | | |
| 60° Gloss, percent reflectance | 23 | 14 | 19 | 17 | 18 | 12 |
| 85° Gloss, percent reflectance | 41 | 25 | 36 | 34 | 39 | 17 |
| Conveyor Speed, 36.6 meters/minute | | | | | | |
| 60° Gloss, percent reflectance | 21 | 16 | 24 | 20 | 21 | 11 |
| 85° Gloss, percent reflectance | 43 | 30 | 45 | 42 | 40 | 20 |

I claim:
1. An ultraviolet light curable coating composition comprising:
   a. at least one photoinitiator which generates a radical pair by way of unimolecular homolysis resulting from photoexcitation, at least one member of said radical pair being capable of initiating addition polymerization of acrylyloxy groups;
   b. at least one photosensitizer which
      (1) has a triplet energy in the range of from 54 to 72 kilocalories per mole, and
      (2) promotes photopolymerization through bimolecular photochemical reactions;
   c. at least one quencher
      (1) having at least one quenching moiety which quenches said photosensitizer to an extent greater than the extent to which said photosensitizer is quenched by acrylyloxy groups,
      (2) which is not itself either an effective initiator or an effective inhibitor of free radical polymerization of acrylyloxy groups,
      (3) which does not produce products during quenching of said photosensitizer which are either effective initiators or effective inhibitors of free radical polymerization of acrylyloxy groups, (4) which either does not quench said photoinitiator or quenches said photoinitiator at a rate much less than the rate at which said photoinitiator induces polymerization of acrylyloxy groups so as not to significantly interfere with the initiation of free radical polymerization of acrylyloxy groups by said member of said radical pair, and (5) which has at least one of the following characteristics:
  (i) a triplet energy in the range of from 35 to 68 kilocalories per mole, but lower than the triplet energy of said photosensitizer,
  (ii) an ionization potential in the range of from about 6½ to 9 electron volts,
  (iii) an ionization potential in the range of from 10½ to about 12 electron volts; and d. at least one compound having a plurality of acrylyloxy groups and capable of being free radically addition polymerized by interaction with said photoinitiator and said photosensitizer; wherein upon exposure to ultraviolet light, a coating of said coating composition is cured to a crosslinked film having a lower gloss than if said quencher were absent.

2. THe coating composition of claim 1 wherein said photosensitizer comprises benzophenone.

3. The coating composition of claim 1 wherein said photoinitiator comprises α,α-dimethoxy-α-phenylacetophenone.

4. The coating composition of claim 1 wherein said quencher comprises a polymerizable monomer.

5. The coating composition of claim 1 wherein said quencher comprises N-vinyl-2-pyrrolidone.

6. The coating composition of claim 1 wherein said quencher is N-vinylcaprolactam.

7. The coating composition of claim 1 wherein said quencher comprises 2-phenoxyethyl acrylate.

8. The coating composition of claim 1 wherein said quencher comprises styrene.

9. The coating composition of claim 1 wherein said quencher comprises naphthalene.

10. The coating composition of claim 1 additionally containing pigment.

11. The coating composition of claim 10 wherein said pigment comprises flatting pigment.

12. The coating composition of claim 11 wherein said flatting pigment comprises silica flatting pigment.

13. The coating composition of claim 1 additionally containing monomer having monoacrylic functionality.

14. The coating composition of claim 1 wherein:
  a. said photoinitiator is present in an amount in the range of from about 0.01 percent to about 10 percent by weight based on the weight of the binder of said coating composition;
  b. said photosensitizer is present in an amount in the range of from about 0.01 percent to about 50 percent by weight based on the weight of the binder of said coating composition;
  c. said quencher is present in an amount in the range of from about 0.01 percent to about 90 percent by weight based on the weight of the binder of said coating composition; and
  d. said compound having a plurality of acrylyloxy groups is present in an amount in the range of from about 10 to about 99 percent by weight based on the weight of the binder of said coating composition.

15. A method of forming a film of low gloss comprising exposing a coating of the coating composition of claim 1 to ultraviolet light.

16. The method of claim 15 wherein said exposure is conducted in air.

17. A method of forming a film of low gloss comprising applying to a substrate a coating of the coating composition of claim 1 and exposing said coating to ultraviolet light.

18. The method of claim 18 wherein said exposure is conducted in air.

* * * * *

UNITED STATES PATENT AND TRADEMARK OFFICE
CERTIFICATE OF CORRECTION

PATENT NO. : 4,229,274
DATED : October 21, 1980
INVENTOR(S) : Leland H. Carlblom It is certified that error appears in the above-identified patent and that said Letters Patent are hereby corrected as shown below:

Column 22, line 40, "Claim 18" should be --Claim 17--.

Signed and Sealed this

Twenty-first Day of April 1981

[SEAL]

Attest:

RENE D. TEGTMEYER

*Attesting Officer*    *Acting Commissioner of Patents and Trademarks*